United States Patent
Blanch et al.

(10) Patent No.: US 12,050,296 B2
(45) Date of Patent: Jul. 30, 2024

(54) SYSTEM FOR GENERATING VELOCITY MODELS OF SUBSALT FORMATIONS

(71) Applicant: BHP Billiton Petroleum (Deepwater) Inc., Houston, TX (US)

(72) Inventors: Joakim Oscar Blanch, Houston, TX (US); Alexander Vladimirovich Kostin, Katy, TX (US); Christopher Andrew Hurren, Perth (AU); Jonathan DeWitt Jarvis, Houston, TX (US); Neil Gavin Evans, Houston, TX (US)

(73) Assignee: Woodside Energy (Deepwater) Inc., Houston, TX (US)

( * ) Notice: Subject to any disclaimer, the term of this patent is extended or adjusted under 35 U.S.C. 154(b) by 1827 days.

(21) Appl. No.: 15/968,946

(22) Filed: May 2, 2018

(65) Prior Publication Data

US 2019/0339406 A1    Nov. 7, 2019

(51) Int. Cl.
G01V 1/00 (2024.01)
G01V 1/30 (2006.01)
G01V 1/34 (2006.01)
G01V 1/38 (2006.01)

(52) U.S. Cl.
CPC .............. *G01V 1/303* (2013.01); *G01V 1/345* (2013.01); *G01V 1/3808* (2013.01); *G01V 1/3852* (2013.01); *G01V 2210/1427* (2013.01); *G01V 2210/167* (2013.01); *G01V 2210/6222* (2013.01); *G01V 2210/67* (2013.01)

(58) Field of Classification Search
USPC .......................................................... 367/21
See application file for complete search history.

(56) References Cited

U.S. PATENT DOCUMENTS

| | | | | |
|---|---|---|---|---|
| 5,138,584 A | * | 8/1992 | Hale | G01V 1/28 367/50 |
| 7,400,553 B1 | * | 7/2008 | Jin | G01V 1/28 367/50 |
| 9,746,569 B2 | * | 8/2017 | Sallas | G01V 1/006 |
| 10,436,926 B2 | * | 10/2019 | Sollner | G01V 3/083 |

(Continued)

OTHER PUBLICATIONS

International Preliminary Report on Patentability issued in related PCT Application No. PCT/US2019/029298 mailed Nov. 12, 2020, 11 pages.

(Continued)

*Primary Examiner* — James R Hulka
(74) *Attorney, Agent, or Firm* — Baker Botts L.L.P.

(57) ABSTRACT

The following disclosure relates to a system for generating velocity models of salt and subsalt formations. The system provides accurate velocities for both salt and subsalt formations. In some embodiments, the disclosure relies on the combination of three elements: the "long offset" between seismic source and seismic receiver node, the use of multiple seismic signals at different geographic locations, and the refraction of the seismic wave off of the "basement" of the earth's crust. By combining the multiple seismic signals with the "fast basement," which is accessible due to the long offset of sources and receiver nodes, it is now possible to determine a more accurate seismic propagation velocity for salt and subsalt formations by using FWI-based refraction tomography.

24 Claims, 8 Drawing Sheets

(56) References Cited

U.S. PATENT DOCUMENTS

| | | | |
|---|---|---|---|
| 2013/0100778 A1* | 4/2013 | Ruet | G01V 1/133 |
| | | | 367/142 |
| 2014/0200813 A1 | 7/2014 | Montel et al. | |
| 2014/0369161 A1* | 12/2014 | Sallas | G01V 1/3808 |
| | | | 367/15 |
| 2015/0085605 A1* | 3/2015 | Tenghamn | G01V 1/137 |
| | | | 367/15 |
| 2016/0187507 A1* | 6/2016 | Brenders | G06F 17/10 |
| | | | 703/2 |
| 2016/0238729 A1 | 8/2016 | Warner et al. | |
| 2017/0068008 A1* | 3/2017 | Colombo | G01V 1/288 |
| 2017/0168178 A1 | 6/2017 | Crawley et al. | |
| 2018/0045841 A1 | 2/2018 | Grenie et al. | |
| 2018/0052245 A1 | 2/2018 | Sollner et al. | |

OTHER PUBLICATIONS

International Search Report and Written Opinion issued in PCT/US2019/029298, dated Aug. 13, 2019 (14 pages).

J.A. Van Avendonk, et al.: "Continental Rifting and Sediment Infill in the Northwestern Gulf of Mexico", Geology, published online Jun. 5, 2015; doi: 10.1130/G36798.1 (5 pp.).

Mikael Evain, et al.: "Structure of the Lesser Antilles Subduction Forearc and Backstop from 3D Seismic Refraction Tomography" Tectonophysics 603 (2013) pp. 55-67.

* cited by examiner

SYSTEM FOR GENERATING VELOCITY MODELS OF SUBSALT FORMATIONS

TECHNICAL FIELD

The present disclosure relates generally to systems for generating velocity models of subterranean formations and, more particularly, to systems for generating velocity models of subsalt formations.

BACKGROUND

In the field of subterranean seismic imaging, an accurate velocity model is required in order to produce a high fidelity seismic image of a subterranean formation. A velocity model is a mathematical model describing the velocity at which a seismic signal travels through the earth at specific points in the earth. Once the velocity model is determined, it can be used to determine the depth and thickness of subterranean structures, which in turn allows for the creation of an image of those subterranean structures.

In the field of tomography, there are many methods for generating velocity models, but all conventional methods rely on the transmission of signals through the earth. The signals, which are transmitted from a location on or above the surface, travel through the earth, interact with the subterranean formation in some way, and then return to the surface. Once at the surface, the signals may be measured by sensors, the data from which allows for the determination of the velocity model of the subterranean formations.

The methods for generating velocity models take advantage of the physics of the travelling seismic waves. For example, in ray-based methods of tomography, seismic signals or seismic waves may be modeled as geometric rays that propagate, reflect, and refract according to the laws of classical optics. In reflection methods, seismic signals may travel into the earth and reflect off of the subterranean formation in question. However, a refraction method known as "refraction tomography" may rely on seismic signals that travel through the formation, rather than reflect off the formation.

When generating velocity models, in addition to the physical considerations described above, one must take into account mathematical considerations as well. Generally speaking, the calculations involved in generating a velocity model are a type of inversion process, which allows for an object to be described based on measurements or observations associated with the object. Due to the complexity of the object as well as technological limitations, there is generally a lack of sufficient seismic data to determine a unique solution. Therefore, much of the field of tomography is dedicated to methods for attempting to estimate a solution based on the interpretation of seismic data.

In the specific case of refraction tomography, this method attempts to find the best estimate of the solution through an iterative calculation process. Typically, the calculation begins with a person hand-picking the first arrival times of the seismic waves. Then, one applies a methodology known as "travel time tomography," which works by computing travel times using an already-existing velocity model. In this methodology, if the computed travel times end up being incorrect upon further observation, then one must use the difference between computed and picked or measured travel times to generate a more correct velocity model. At first blush, this may sound circular because one is generating a velocity model from travel times that are partly determined by another velocity model. Nonetheless, the iterative nature of travel time tomography allows the velocity model to converge to a best estimate of the solution.

Another methodology used in refraction tomography, known as FWI (Full Waveform Inversion) is considered to be an improvement upon travel time tomography because it does not require the hand-picking of first arrival times of the seismic waves. Additionally, FWI compares waveforms directly and can thus be implemented as a computer algorithm that is able to handle lager amounts of input data and thus generate a more accurate velocity model in less time. The crux of FWI-based refraction tomography is that it relies on the refraction characteristics of seismic waves in subterranean material of varying densities. First, one must account for the fact that the deeper any given material is in the earth's crust, the denser it will likely be. Second, one must account for the fact that the denser any given material is, the larger the angle of refraction for a seismic wave travelling through the material. Putting these facts together, one can see that as a seismic wave travels deeper into the earth, it will likely encounter denser material, which will in turn gradually increase the angle of refraction of the seismic wave. In fact, if the seismic wave travels deep enough, where there is material of sufficient density, the angle of refraction may increase enough to cause the seismic wave to turn upwards and travel back toward the surface without the aid of reflection. In short, FWI-based refraction tomography depends on the fact that, as the wave travels deeper, the seismic propagation velocity increases such that seismic waves may turn upward without reflection, even though the wave initially propagated downwards from sources located on the surface. This change of direction allows for the seismic wave to return directly to the surface without reflection and be observed by receiver nodes.

However, there is an industry-wide problem with FWI-based refraction tomography in situations where one wants to image subterranean formations located below salt formations (known as subsalt formations). It is well known in the art that it is difficult to determine subsalt velocities because the sediments below the salt have slower seismic velocities (lower indices of refraction) than the salt formation above. Therefore, due to the slower velocities, the seismic waves that travel through the salt formation will not refract at a sufficient angle to cause the seismic wave to turn back upwards and return to the surface. To return to the surface, the seismic wave would have to pass through a material with a greater velocity (greater index of refraction) than the salt formation. In other words, the continual refraction required by the FWI-based refraction tomography requires ever increasing velocities (ever increasing indices of refraction) in the subterranean material as the seismic wave travels deeper. In such situations, the only seismic waves that return to the surface are those that reflect off of the salt formation itself. Therefore, using current, industry-wide methods, it is not possible to determine accurately the velocity model of the subsalt region through FWI-based refraction tomography.

In addition, current industry models assume that the subterranean salt formation has a constant seismic propagation velocity (a constant index of refraction). Although it is true in theory that a pure salt body has a constant seismic propagation velocity, in practice salt formations are not pure salt but are instead mixtures of salt and other subterranean non-salt materials. Therefore, in practice, salt formations do not have a constant seismic propagation velocity. For the same reasons as above, FSI-based refraction tomography is not able to determine an accurate seismic propagation velocity of the salt formation itself, let alone the subsalt formation.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

The following disclosure relates to a system for generating velocity models of salt and subsalt formations. The system is unique because it may provide accurate velocities for both salt and subsalt formations. In some embodiments, the disclosure relies on the combination of three elements: the "long offset" between seismic source and seismic receiver node, the use of multiple seismic signals at different geographic locations, and the refraction of the seismic wave off the "basement" of the earth's crust.

First, the "basement" is a broad term that refers to material deep in the earth's crust that is very dense, relatively speaking, and very old. In some embodiments, the basement material is comprised of granite or other hard material. The relatively high density of the basement causes at least some of the seismic signals or seismic waves entering the basement to refract at a relatively high angle in proportion to the density of the basement material. This is because the relatively high-density basement has a higher seismic propagation velocity (higher index of refraction) than the less-dense sediments located above it.

Second, the "long offset" between the seismic source and seismic receiver nodes refers to the relatively large distance between source and receiver nodes that is required for a seismic signal to travel into the earth, refract upwards due to the high density of the basement, and reach at least one receiver node on the surface, be it the ocean floor or dry land. The long offset between seismic sources and seismic receivers may be considered "long" because it involves distances that are longer than typically used in the industry.

Third, the use of multiple seismic signals at different geographic locations allows the heavily refracted signal to create a three-dimensional velocity model of the subsalt formation. For example, if only one source and one receiver node were used, then the refracted seismic waves or seismic signals would provide, at best, a two-dimension velocity model of the subterranean formation because the ray of the seismic wave travels, practically speaking, within a plane. Thus, the use of multiple seismic waves from seismic sources at different geographic locations allows for the creation of multiple intersecting planes of data, and therefore enough data for a three-dimensional velocity model.

By combining the multiple seismic signals with the "fast basement," which is accessible due to the long offset of sources and receiver nodes, it is now possible to determine a more accurate seismic propagation velocity for salt and subsalt formations by using FWI-based refraction tomography.

Figure 1A:
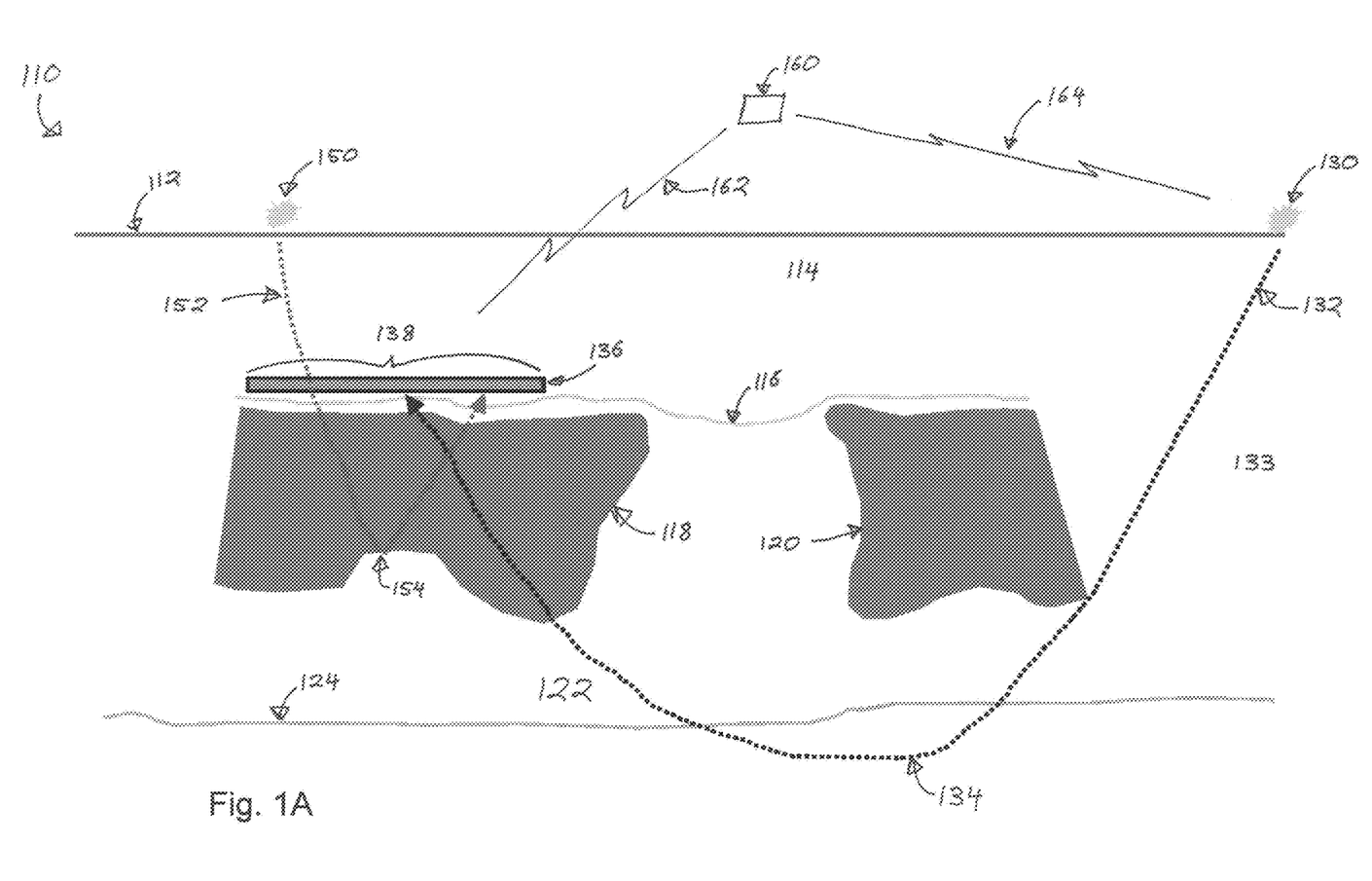
FIG. 1A is a cross-sectional view of a portion of the earth's crust showing the path of a seismic wave through the ocean and subterranean formations, in accordance with an embodiment of the present disclosure.

Turning now to the drawings, FIG. 1A shows an embodiment of the present disclosure and a cross-sectional portion of the earth 110 with ocean surface 112, ocean 114, ocean floor 116, subterranean salt formations 118 and 120, subterranean subsalt sediment 122, and basement 124. In some embodiments, subterranean subsalt sediment 122 may contain a fluid reservoir or other formation (not shown) which may contain at least one of hydrocarbon fluids and non-hydrocarbon fluids.

The disclosed system has a long-offset seismic transmitter 130, which may be stationary or moving. In some embodiments, seismic transmitter 130 may be towed by a boat (not shown) that floats on ocean surface 112. In other embodiments, seismic transmitter 130 may be placed on a vehicle (not shown) that moves on the surface of dry land (not shown). Experiments to date indicate that, in situations where this system is deployed in the Gulf of Mexico, seismic source transmitter 130 should travel over a surface area with an aperture length of at least 15 km. A person of ordinary skill would appreciate that this range may not apply in situations where the disclosed system is applied elsewhere. As further discussed below, the aperture length defines the farthest distance that seismic transmitter 130 may travel from the area of dispersed nodes 136.

In accordance with an embodiment of the present disclosure, long-offset seismic transmitter 130 may emit seismic signal 132 into the ocean 114. In some embodiments, seismic signal 132 may be, or may create, one or more seismic waves that may propagate through fluid and solid materials. In this particular embodiment, seismic signal 132 may refract according to the laws of physics as seismic signal 132 travels deeper into the earth 110. Specifically, seismic signal 132 may refract as it travels through ocean 114, ocean floor 116, and subterranean region 133 until reaching basement 124. As will be explained below, the index of refraction (seismic propagation velocity) will vary based on material as seismic signal 132 travels deeper into the earth 110.

In some embodiments, basement 124 may be comprised of very dense and old material, such as granite. Upon reaching basement 124, seismic signal 132 may refract 134 at a relatively high angle of refraction due to the high index of refraction of the dense material in basement 124. Specifically, in some embodiments, the material of basement 124 has a higher index of refraction (higher seismic propagation velocity) than all material above basement 124 up to the ocean surface 112. While travelling through basement 124, the magnitude of the refraction may be such that seismic signal 132 may turn upward 134 and may travel through the surface of basement 124, subsalt sediment 122, salt formation 118, and ocean floor 116 to reach a collection of dispersed seismic receiver nodes 136 spread over surface area 138 on the ocean floor 116. Thus, refracted seismic signal 132 may pass through subsalt sediment 122 before reaching dispersed receiver nodes 136 and, thereby, may provide sufficient data to determine a velocity model of subsalt sediment 122 and of salt formation 118.

Dispersed seismic receiver nodes 136 may be a plurality of detectors that can detect seismic waves that reach the ocean floor 116 after propagating through the earth 110. Receiver nodes 136 may be configured to receive the refracted seismic waves from seismic signal 132 and output a node signal based on the received refracted seismic waves. Also, dispersed seismic receiver nodes 136 may act as a seismic recording system that, in this particular embodiment, is disposed on the ocean floor. In other embodiments, seismic recording system 136 may be disposed on dry land and be cable of operating in the same manner as disclosed here. In some embodiments, dispersed receiver nodes 136 may be a plurality of geophones or hydrophones that are placed on the ocean floor 116. Although geophones are typically placed on dry land, one of ordinary skill in the art would appreciate that geophones, in principle, may be placed on the ocean floor. Dispersed nodes 136 may be in communication with a computer system 160 and may be configured to output at least one node signal based on one or more received seismic waves. As those of ordinary skill in the art will appreciate, the nodes 136 may be equipped with a computer memory storage (and optionally a local processor) so that they can store (and also optionally at least partially process) the seismic wave signals that they receive. In embodiments where dispersed nodes 136 are geophones, the node signal may be a geophone signal. Experiments to date indicate that, in situations where this disclosed system is to be deployed in the Gulf of Mexico, dispersed receiver nodes 136 should be spread over a surface area of any reasonable shape, where the longest dimension of that shape may be at least 25 km. Furthermore, experiments to date indicate that, in situations where this system is deployed in the Gulf of Mexico, adjacent receiver nodes should be spaced from each other at a distance of approximately 1 km to 2 km. A person of ordinary skill would appreciate that these ranges may not apply in situations where the disclosed system is applied elsewhere.

The computer system 160, which is in communication with dispersed receiver nodes 136 is capable of receiving output signals from dispersed nodes 136. In this particular embodiment, computer system 160 is shown as being wirelessly connected 162 to dispersed nodes 136 and wirelessly connected 164 to seismic transmitter 130. However, a person of ordinary skill would appreciate that other types of connections, such as wired connections, may be made instead. The computer system 160 may include at least one processor and at least one memory, the memory comprising a plurality of non-transitory executable instructions that, when executed, cause the at least one processor to determine velocities of the refracted seismic waves based, at least in part, on the output receiver node signals from receiver nodes 136. Also, the computer system 160 may generate a three-dimensional velocity model of the subterranean formations, including but limited to subterranean salt formation 118 and subterranean subsalt sediments 122. This three-dimensional velocity model may be based, at least in part, on an inversion and the velocities of the refracted seismic waves. The computer system 160 may have executable instructions that, when executed, further cause the processor to generate a three-dimensional image using the three-dimensional velocity model of the subterranean formation. Therefore, the computer system 160, using at least in part the output node signal from dispersed receiver nodes 136, may generate a three-dimensional visual image of subterranean salt formation 118 and subterranean subsalt sediment 122.

Put another way, the computer system 160 may be capable of recording data about the refracted seismic waves using, at least in part, the received signal from the seismic recording system. The computer system 160 may determine velocities of the refracted seismic waves based, at least in part, on the recorded data about the refracted seismic waves. Also, the computer system 160 may convert the determined velocities of the refracted seismic waves into at least one three-dimensional velocity model of the subterranean formations, including but not limited to subterranean salt formation 118 and subterranean subsalt sediments 122. The computer system 160 may then use at least one three-dimensional velocity model to generate at least one three-dimensional image of the subterranean formations, including but not limited to subterranean salt formation 118 and subterranean subsalt sediments 122.

Figure 1B:
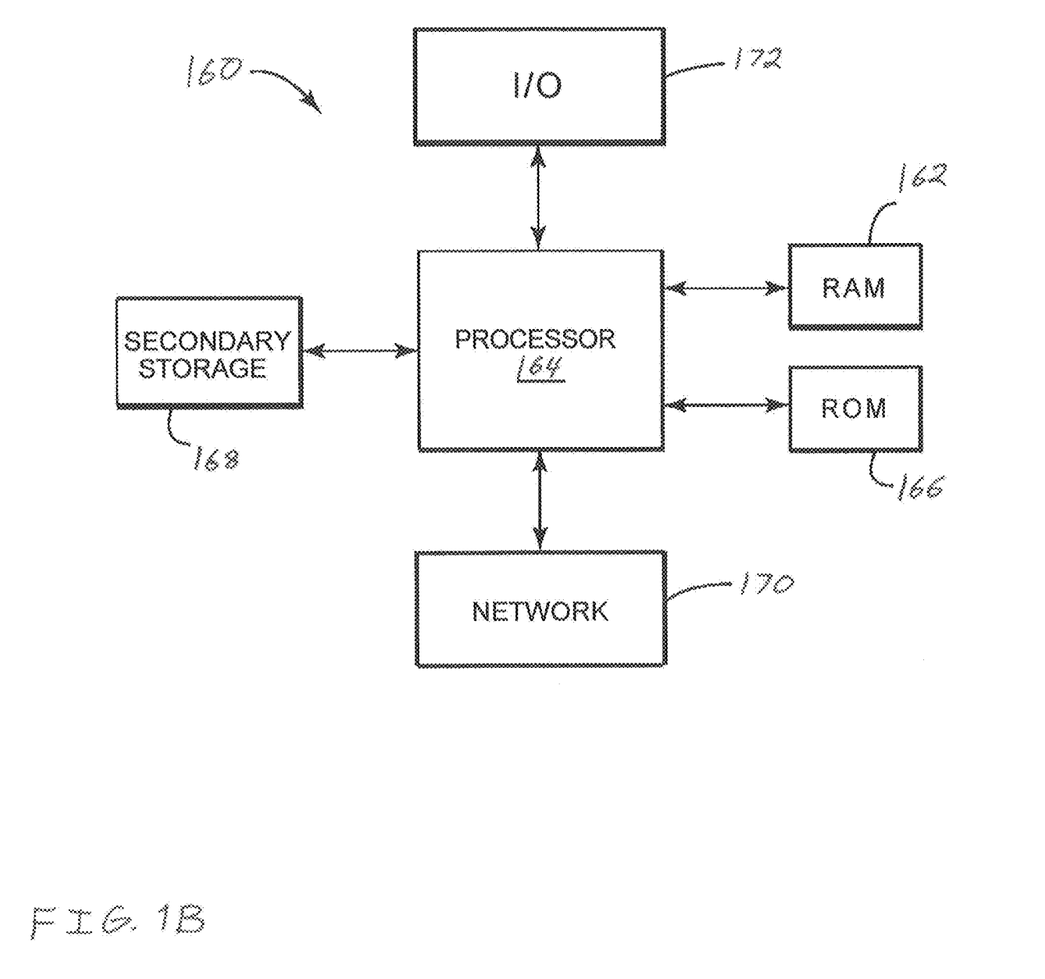
FIG. 1B is a diagram of the components of a computer system, in accordance with an embodiment of the present disclosure.

Referring to FIG. 1B, in some embodiments the computer system 160 may be in the form of an information handling system. For purposes of this disclosure, an information handling system or computing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM) 162, one or more processing resources 164 such as a central processing unit (CPU) or hardware or software control logic, ROM 166, and/or other types of nonvolatile memory 168. Additional components of the information handling system may include one or more disk drives (not shown), one or more network ports 170 for communication with external devices as well as various input and output (110) devices 172, such as a keyboard, a mouse, and a video display. The information handling system may also include one or more buses (not shown) operable to transmit communications between the various hardware components. Example information handling systems include server systems, computer terminals, handheld computing devices, tablets, smartphones, etc.

The present disclosure is shown in contrast to a reflection tomography method, as known in the art, where short-offset seismic transmitter 150 may emit seismic signal 152 into salt formation 116 and reflect 154 into seismic receiver nodes 136. As can be seen in this example, reflected seismic signal 152 is not able to enter subsalt formation 122 and also reach seismic receiver nodes 136. Thus, reflected seismic signal 152 will not provide sufficient data to determine a velocity model of subsalt sediment 122.

Figure 2:
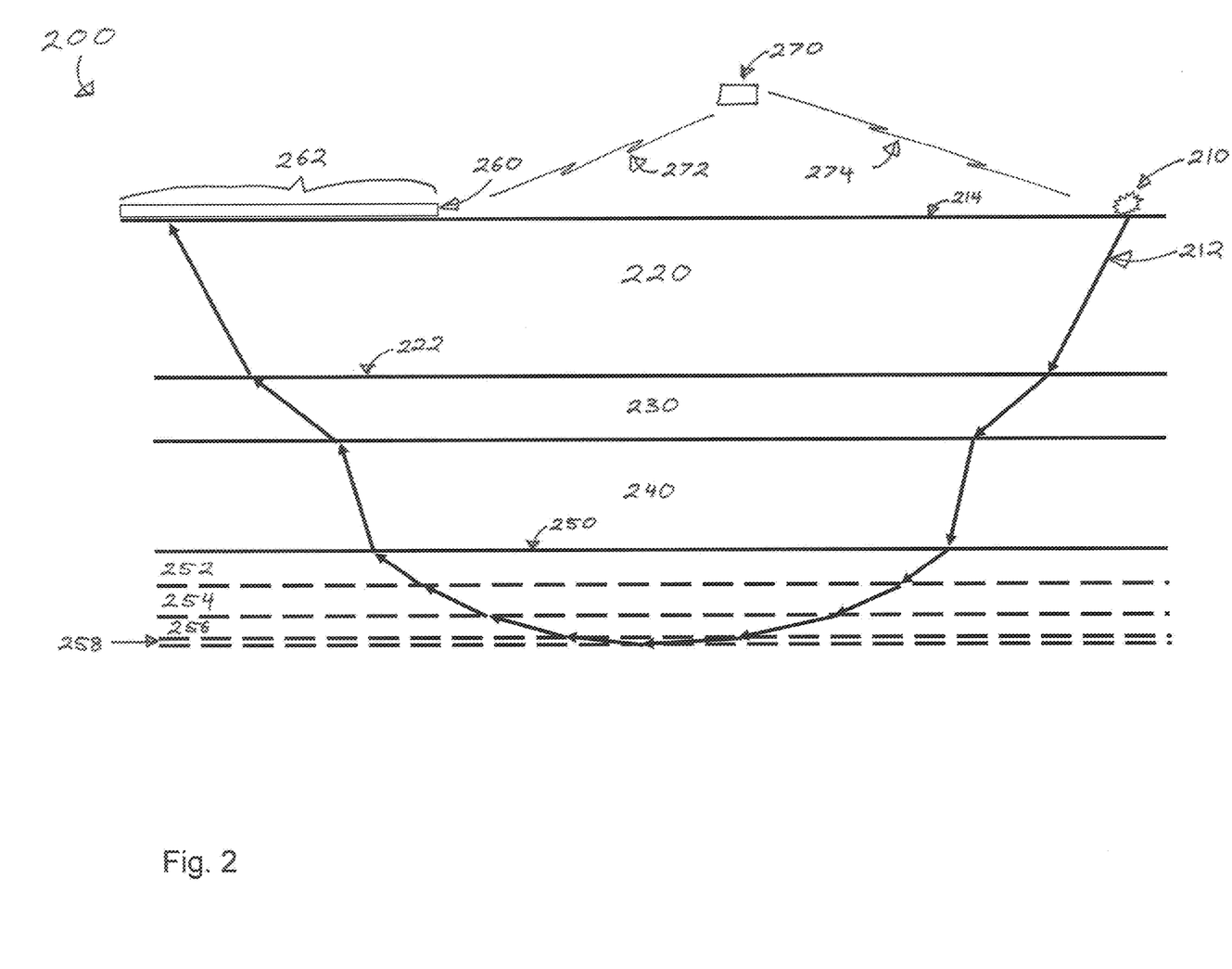
FIG. 2 is a cross-sectional view of a portion of the earth's crust showing a ray-tracing diagram of a seismic wave travelling through a portion of the earth's crust, in accordance with an embodiment of the present disclosure.

FIG. 2 is a cross-sectional view of a portion of the earth's crust showing a ray-tracing diagram 200 of the present disclosure, showing how the seismic waves may refract when propagating into the earth 110 as in FIG. 1A. In this embodiment, seismic source 210 located on surface 214 may emit seismic signal 212 that may travel initially into region 220, where region 220 has an index of refraction that may cause seismic signal 212 to refract upon entering region 220. In some embodiments, region 220 may be the ocean and surface 214 may be the surface of the ocean. In other embodiments, region 220 may be a layer of surface sediment and surface 214 may be dry land. Seismic signal 212 may then enter region 230, which may have a higher index of refraction (higher seismic propagation velocity) than region 220, and therefore may cause seismic signal 212 to refract at a higher angle than in region 220. In some embodiments, region 230 may be a subterranean salt formation. Seismic signal 212 may then enter region 240, which may have a lower index of reflection (lower seismic propagation velocity) than region 230, and therefore may cause seismic signal 212 to refract at a lower angle than in region 240. In some embodiments, region 240 may be subsalt sediments that have a lower index of refraction than the above salt formation.

Seismic signal 212 may then enter basement 250, which, as described in FIG. 1A, may be comprised of very dense, old, and hard material. In some embodiments, basement 250 may consist of granite and other hard rock. As a whole, basement 250 may have a higher index of refraction (high seismic propagation velocity) and all of the regions above it. Furthermore, the density of basement 250 may increase with depth, and thus the index of refraction for basement 250 may increase with depth. In ray-tracing diagram 200, this is shown by regions 252, 254, 256, 258 (shown separated by dotted lines), each of which has a progressively higher index of refraction. As shown in this particular embodiment, seismic signal 212 may refract at greater angles as it travels deeper into basement 250 by passing through regions 252, 254, 256, and 258. In this particular embodiment, seismic signal 212 may refract to such an extreme that in region 258, seismic signal 212 may begin to turn upward and travel again, now in reverse order, through regions 256, 254, and 252. As seismic signal 212 travels up through basement 250, it may refract gradually to a lesser degree in response to the gradually decreasing indices of refraction of regions 256, 254, and 252.

In this particular embodiment, after exiting basement 250, seismic signal 212 may propagate upward toward surface 214. As seismic signal 212 travels upward, it may pass through regions 240, 230, and 220, and refract at angles that are determined according to the indices of refraction in those regions. Eventually, in this particular embodiment, seismic signal 212 may reach the collection of seismic receiver nodes 260 on surface 214 and spread over area 262. In other embodiments, where region 220 is the ocean, seismic receiver nodes 260 could be placed at the ocean floor (not shown), which would be the interface 222 between regions 220 and 230. The propagation of seismic signal 212 through the various regions and basement 250 may work the same regardless of the placement of the seismic receiver nodes 260.

As described thoroughly in FIG. 1A, seismic receiver nodes 260 may be hydrophones or geophones in some embodiments. Also, seismic receiver nodes 260 may be connected to a computer system 270 that works in the manner described above in FIG. 1A. In this particular embodiment, computer system 270 is shown as being wirelessly connected 272 to dispersed nodes 260 and wirelessly connected 274 to seismic transmitter 210. However, a person of ordinary skill would appreciate that other types of connections, such as wired connections, may be made instead.

Figure 3:
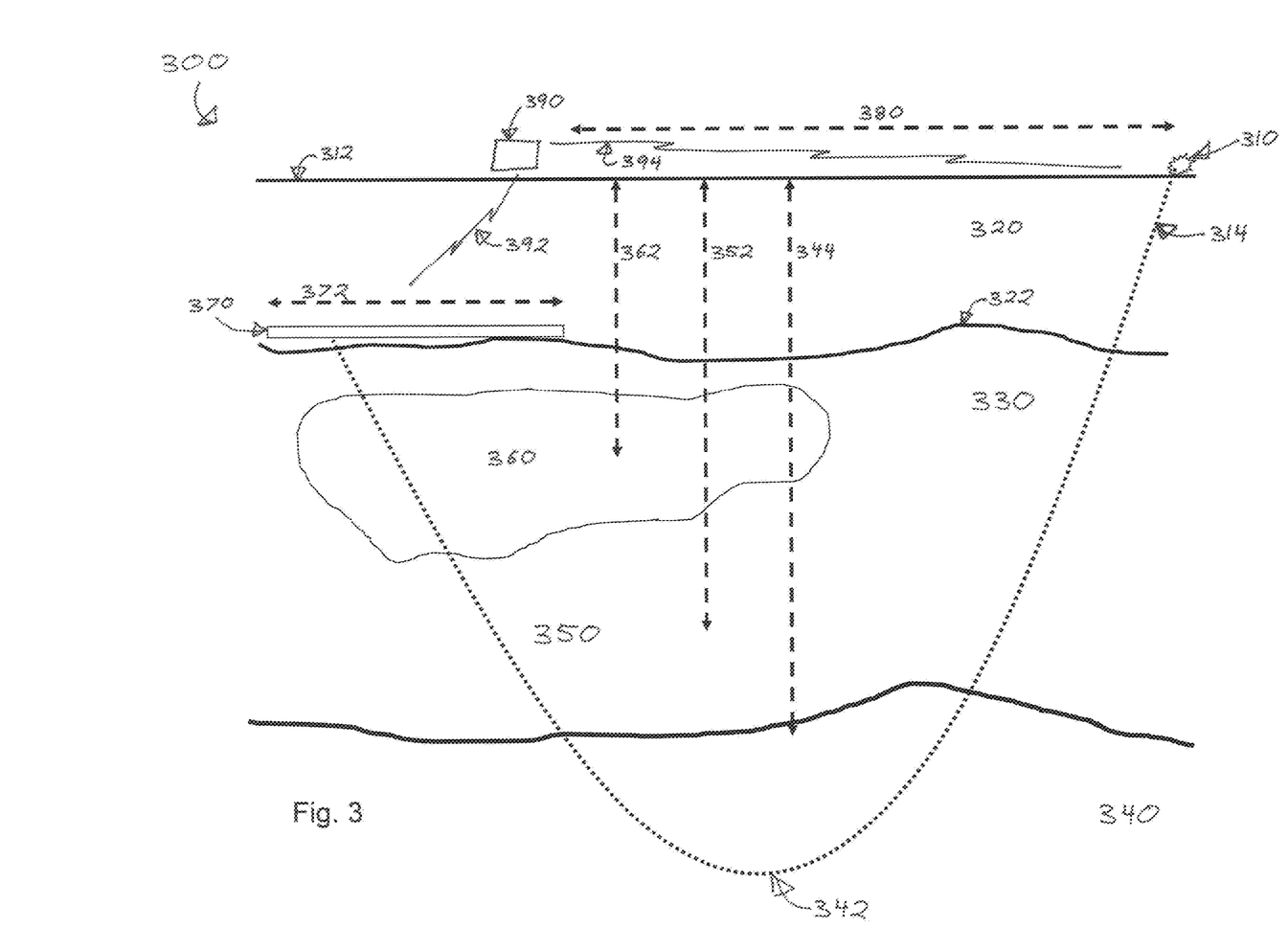
FIG. 3 is a cross-sectional view of a portion of the earth's crust showing the path of a seismic wave through the ocean and subterranean formations, in accordance with an embodiment of the present disclosure.

FIG. 3 is a cross-sectional view of a portion of the earth's crust 300 with another embodiment of the present disclosure. Seismic source 310, located on surface 312, may emit seismic signal 314 into first zone 320. In some embodiments, first zone 320 may be the ocean and surface 312 may be the surface of the ocean. Seismic signal 314 may continue to travel through an interface 322 into subterranean region 330. In some embodiments, interface 322 may be the ocean floor. Similar to FIG. 1A, seismic signal 314 may propagate down to basement 340. As described thoroughly in FIGS. 1 and 2, in some embodiments, basement 340 may comprise very dense, hard, and old rock, such as granite, which causes seismic signal 314 to heavily refract 342 and turn upwards.

As seismic signal 314 travels upward, it may travel up through second zone 350 and then first zone 360. First zone 360 may have a higher seismic propagation velocity (higher index of refraction) than second zone 350. Thus, as described in FIG. 2, seismic signal 314 may have a higher angle of refraction as it passes through first zone 360 than second zone 350 (refraction not shown). In some embodiments, first zone 360 may be a subterranean salt formation and second zone 350 may be subsalt formation. In some embodiments, second zone 350 may contain at least one fluid reservoir which in turn contains at least one of hydrocarbon fluids and non-hydrocarbon fluids.

Next, seismic signal 314 may then travel until reaching receiver nodes 370 dispersed over area with a longest dimension 372 on surface 322. Thus, dispersed receiver nodes 370 may receiver accurate velocity information of second zone 350. As described thoroughly in FIG. 1A, seismic receiver nodes 370 may be hydrophones or geophones in some embodiments. Also, seismic receiver nodes 370 may be connected to a computer system 390 that works in the manner described above in FIG. 1A. In this particular embodiment, computer system 390 is shown as being wirelessly connected 392 to dispersed nodes 370 and wirelessly connected 394 to seismic transmitter 310. However, a person of ordinary skill would appreciate that other types of connections, such as wired connections, may be made instead.

As briefly described in FIG. 1A, longest dimension 372 of dispersed nodes 370 is defined as the longest length of the two-dimensional shape formed by dispersed receiver nodes 370. As will be explained in FIG. 5, if receiver nodes 370 are dispersed in the shape of a rectangle, longest dimension 372 would be the length of the rectangle. As will be described in FIG. 6, if dispersed receiver nodes 370 are dispersed in an irregular shape, longest dimension 372 would be the length of the longest straight line that could be drawn inside of the irregular shape.

The length of longest dimension 372 may be determined by the approximate and relative depths of the subterranean formations that are being studied. In this particular embodiment, first zone 360, second zone 350, and basement 340 each have their own characteristic depths 362, 352, and 344 respectively. Generally speaking, in the physical sciences, a characteristic length is a dimension that defines the scale of a physical system. Often, such length is used as an input to a formula to determine or predict some characteristics of the system. In this particular embodiment, the characteristic length is not the exact depth of a particular region, but instead is an approximate depth that roughly describes the distance of the region in question below surface 312. In most instances, first zone 360, second zone 350, and basement 340, will have irregular shapes. Thus, determining the characteristic depth of each region is a matter of approximation.

As briefly mentioned in FIG. 1A, aperture length 380 is defined as a dimension of the area over which seismic transmitter 310 may travel. The aperture length defines the maximum distance that seismic transmitter 310 may travel away from the area of dispersed nodes 370. In FIG. 3, seismic transmitter 310 is shown at the maximum distance of aperture length 380, which is the farthest distance that seismic transmitter 310 may travel in this particular embodiment. In practice, longest dimension 372 of dispersed receiver nodes 370 may be determined as a function of the characteristic depths 362, 352, and 344 of first zone 360, second zone 350, and basement 340 respectively. Furthermore, aperture length 380 may be determined as a function of longest dimension 372. In other words, the area over which seismic nodes 370 may be placed, and the area over which transmitter 310 may travel, may be defined as a function of the characteristic depths 362, 352, and 344 of first zone 360, second zone 350, and basement 340.

Figure 4:
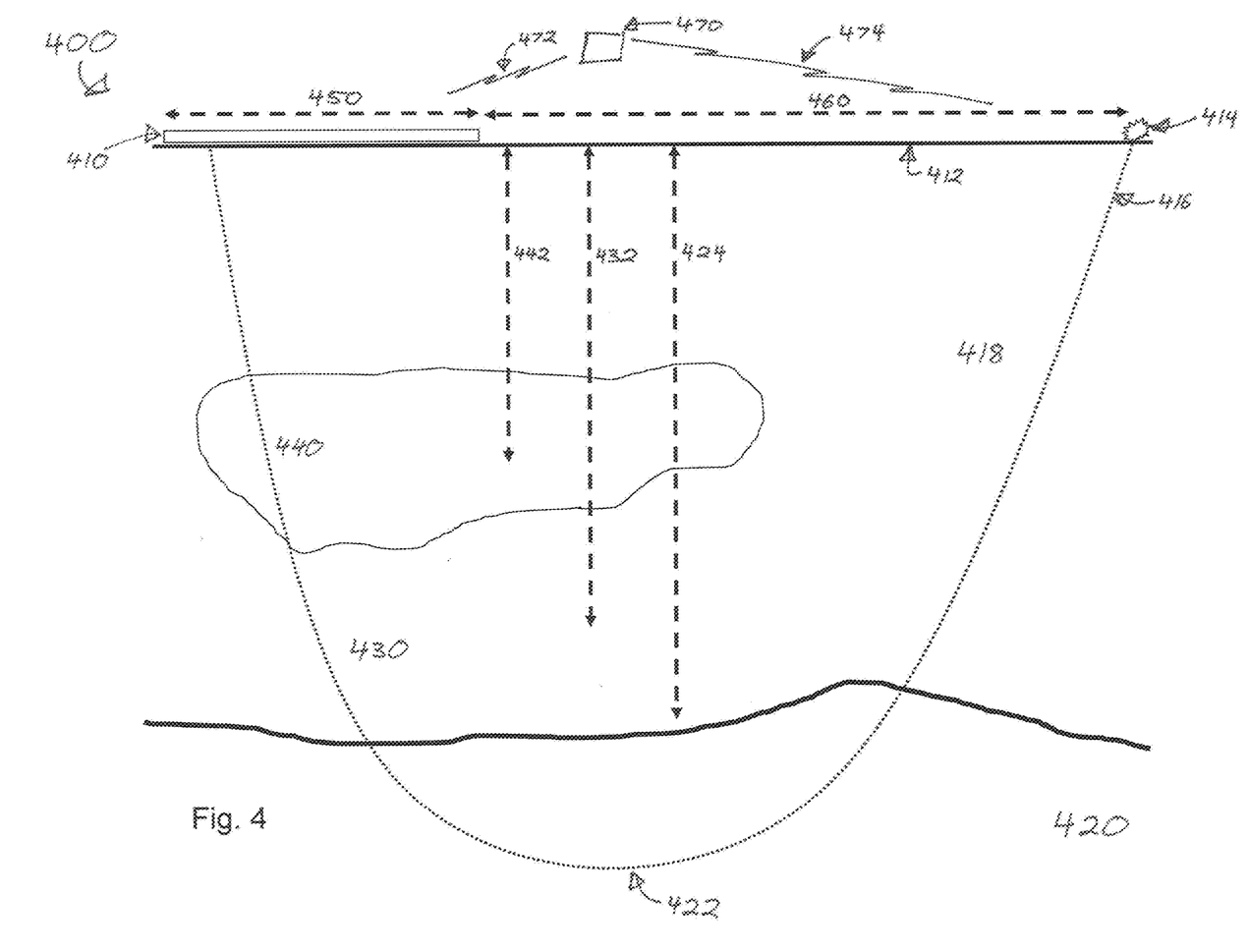
FIG. 4 is a cross-sectional view of a portion of the earth's crust showing the path of a seismic wave through subterranean formations, in accordance with an embodiment of the present disclosure.

FIG. 4 is a cross-sectional view of a portion of the earth's crust 400 with another embodiment of the present disclosure. In this embodiment, seismic receiver nodes 410 are located on the same surface 412 as seismic transmitter 414. In some embodiments, surface 412 may be dry land and transmitter 414 may be placed on a vehicle that travels over the land. As in previously described embodiments, seismic transmitter 414 may emit seismic signal 416 such that it travels through a subterranean area 418 until reaching basement 420. As thoroughly described in FIGS. 1 and 2, at basement 420 seismic signal 416 may refract upward 422 through second zone 430 and first zone 440 toward dispersed receiver nodes 410.

As described previously, first zone 440 may have a higher seismic propagation velocity (higher index of refraction) than second zone 430. As described in FIG. 3, first zone 440, second zone 430, and basement 422 may have characteristic depths 442, 432, and 424. As in previously described embodiments, dispersed nodes 410 may make a two-dimensional shape with a longest dimension 450. As in previously described embodiments, longest dimension 450 may be determined as a function of characteristic depths 442, 432, and 424. As in previously described embodiments, aperture length defines the farthest distance that seismic transmitter 414 may travel from the area of dispersed nodes 450. As in previously described embodiments, aperture length 460 may be defined as a function of longest dimension 450 of dispersed nodes 410. In other words, the area over which seismic nodes 410 may be placed, and the area over which transmitter 414 may travel, may be defined as a function of the characteristic depths 442, 432, and 424 of first zone 440, second zone 430, and basement 420.

Also, seismic receiver nodes 410 may be connected to a computer system 470 that works in the manner described above in FIG. 1A. In this particular embodiment, computer system 470 is shown as being wirelessly connected 472 to dispersed nodes 410 and wirelessly connected 474 to seismic transmitter 414. However, a person of ordinary skill would appreciate that other types of connections, such as wired connections, may be made instead.

Figure 5:
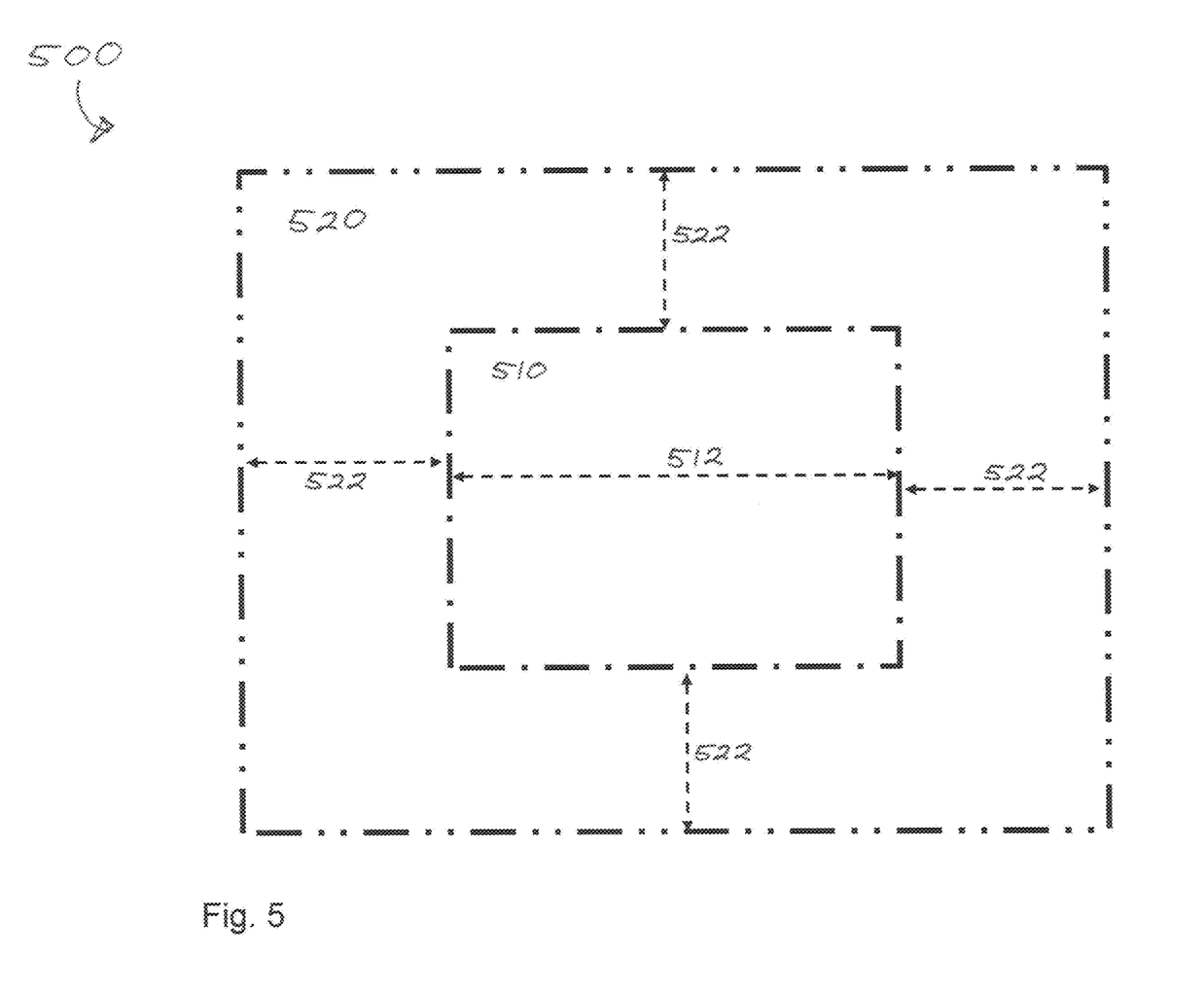
FIG. 5 is a top-down view of the surface area over which the seismic wave sources and dispersed receiver nodes are spaced, in accordance with an embodiment of the present disclosure.

FIG. 5 is a top-down view of two areas 500 defining the locations of the seismic receiver nodes and seismic transmitters. In this particular embodiment, area 510 is the two-dimensional surface area over which the seismic receiver nodes (not shown) are dispersed. In some embodiments, the seismic receiver nodes may be spread over an ocean floor or over the surface of dry land. In this particular embodiment, area 520 is the two-dimensional surface area over which the seismic transmitter (not shown) may travel. In some embodiments, the seismic transmitter may travel on boat over the surface of the ocean or on a vehicle over dry land. In this particular embodiment, areas 510 and 520 are rectangular in shape. However, a person of ordinary skill in the art would appreciate that any two-dimensional shape may be made with the dispersed seismic receiver nodes. In this particular embodiment, longest dimension 512 is shown as the longest length of the rectangle defining area 510. In this particular embodiment, aperture length 522 is shown defining the area 520 by defining the farthest distance that the seismic transmitters (not shown) may travel from area 510.

Figure 6:
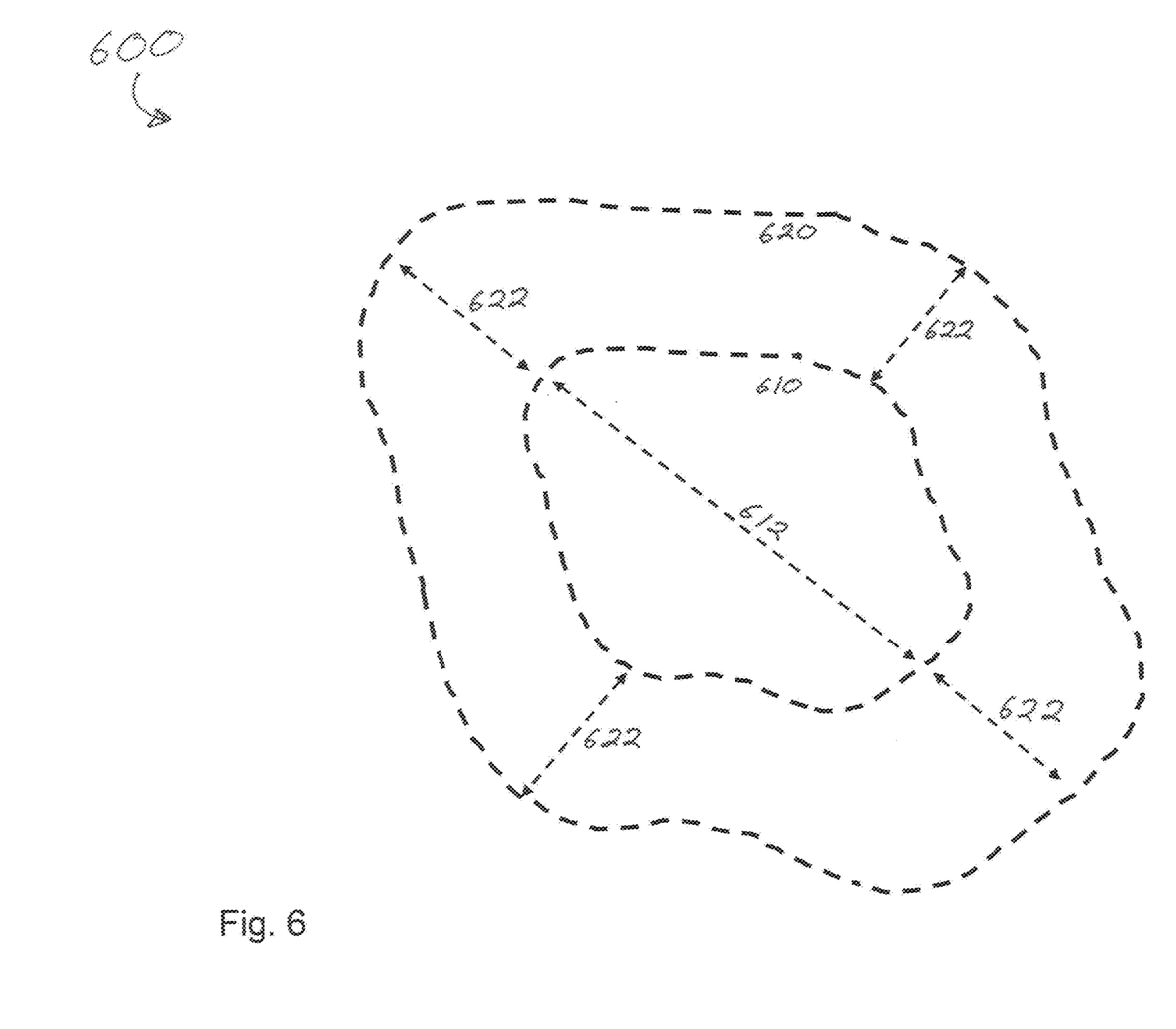
FIG. 6 is a top-down view of the surface area over which the seismic wave sources and dispersed receiver nodes are spaced, in accordance with an embodiment of the present disclosure.

FIG. 6, like FIG. 5 is a top-down view of two areas 600 defining the locations of the seismic receiver nodes and seismic transmitters (not shown). In this particular embodiment, similar to FIG. 5, area 610 is the two-dimensional surface area over which the seismic receiver nodes (not shown) are spread and area 620 is the two-dimensional surface area over which the seismic transmitter (not shown) may travel. However, unlike FIG. 5, in this particular embodiment, areas 610 and 620 are irregularly shaped. Nonetheless, area 610 still has a longest distance 612. Aperture length 622 defines the area 620 over which seismic transmitters may travel.

Figure 7:
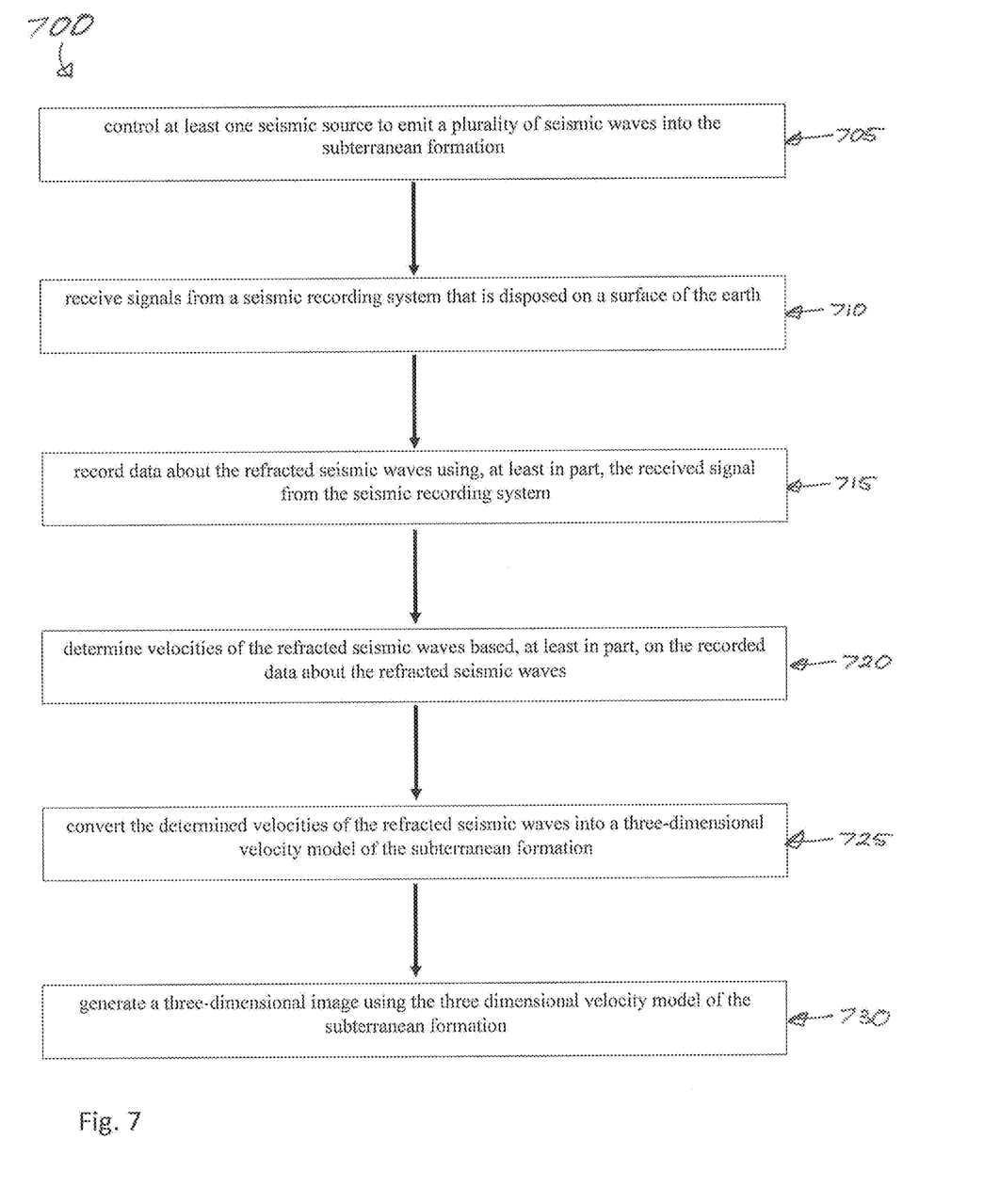
FIG. 7 is a flowchart showing an example of how the disclosed system may be implemented as a method using a computer system, in accordance with an embodiment of the present disclosure.

FIG. 7 is a flowchart 700 showing an example of how the disclosed system may be implemented as a method using a computer system. In step 705, at least one seismic source is controlled to emit a plurality of seismic waves into the subterranean formation. In step 710, signals are received from a seismic recording system that is disposed on a surface of the earth, wherein the signals are create due to seismic waves that have intercepted the seismic recording system. In step 715, data about the refracted seismic waves is recorded using, at least in part, the received signal from the seismic recording system. In step 720, the velocities of the refracted seismic waves are determined based, at least in part, on the recorded data about the refracted seismic waves. In step 725, the determined velocities of the refracted seismic waves are converted into a three-dimensional velocity model of the subterranean formation.

Although the present disclosure and its advantages have been described in detail, it should be understood that various changes, substitutions and alterations can be made herein without departing from the spirit and scope of the disclosure as defined by the following claims.

What is claimed is:

1. A system for creating a three-dimensional velocity model of a subterranean formation below an ocean floor comprising:

a. a transmitter configured to transmit a signal into the subterranean formation,
   i. wherein the subterranean formation has a salt formation above a sediment layer,
   ii. wherein the sediment layer is above a basement,
   iii. wherein the signal causes seismic waves to travel into the subterranean formation; and
   iv. wherein refraction of the seismic waves by the basement causes at least one of the seismic waves to be conveyed through the subterranean formation such that it travels through the sediment layer and the salt formation;
b. a plurality of dispersed geophones located on the ocean floor,
   i. wherein the plurality of geophones is configured to receive the refracted seismic waves and output a geophone signal based on the received refracted seismic waves; and
c. a computer in communication with the plurality of dispersed geophones to receive the output geophone signal, the computer including at least one processor and at least one memory, the memory comprising a plurality of non-transitory executable instructions that, when executed, cause the at least one processor to
   i. determine velocities of refracted seismic waves based, at least in part, on the output geophone signal, and
   ii. generate a three-dimensional velocity model of the subterranean formation, based, at least in part, on an inversion and the velocities of the refracted seismic waves.

2. A system as defined in claim 1 further wherein the executable instructions, when executed, further cause the processor to:
a. generate a three-dimensional image using the three-dimensional velocity model of the subterranean formation.

3. A system as defined in claim 1 further wherein:
a. the sediment layer contains a fluid reservoir which contains at least one of hydrocarbon fluids and non-hydrocarbon fluids.

4. A system as defined in claim 1 further wherein:
a. the geophones are spread over a geophone area with a longest dimension of at least 25 km; and
b. the transmitter travels over a transmitter area with an aperture length of at least 15 km.

5. A system as defined in claim 1 further wherein:
a. the salt formation, the sediment layer, and the basement each has a characteristic depth;
b. wherein the geophones are spread over a geophone area with a longest dimension that is determined as a function of the characteristic depths of the salt formation, the sediment layer, and the basement; and
c. wherein the transmitter travels over a transmitter area with an aperture length determined by a function of the longest dimension of the geophone area.

6. A system as defined in claim 1 further wherein:
a. the transmitter is located on a boat.

7. A system as defined in claim 1 further wherein:
a. adjacent geophones are spaced from each other approximately 1 km to 2 km.

8. The system as defined in claim 1, wherein the refraction of the seismic waves by the basement causes at least one of the seismic waves to be conveyed through the subterranean formation such that it travels upward through the sediment layer and the salt formation.

9. The system as defined in claim 1, wherein the refraction of the seismic waves by the basement causes at least one of the seismic waves to be conveyed through the subterranean formation such that it travels through the sediment layer and then through the salt formation after passing through the sediment layer.

10. A system for creating a three-dimensional velocity model of a subterranean formation below a surface comprising:
a. a transmitter configured to transmit a signal into the subterranean formation,
   i. wherein the subterranean formation has a first zone above a second zone,
   ii. wherein the second zone is above a basement,
   iii. wherein the second zone has a lower seismic propagation velocity than the first zone,
   iv. wherein the first zone has a lower seismic propagation velocity than the basement,
   v. wherein the signal causes seismic waves to travel into the subterranean formation, and
   vi. wherein refraction of the seismic waves by the basement causes at least one of the seismic waves to be conveyed through the second zone and the first zone;
b. a plurality of dispersed receiver nodes located on a surface above the subterranean formation,
   i. wherein the plurality of nodes is configured to receive the refracted seismic waves and output a node signal based on the received refracted seismic waves; and
c. a computer in communication with the plurality of dispersed receiver nodes to receive the output node signal, the computer including at least one processor and at least one memory, the memory comprising a plurality of non-transitory executable instructions that, when executed, cause the at least one processor to
   i. determine velocities of refracted seismic waves based, at least in part, on the output node signal, and
   ii. generate a three-dimensional velocity model of the subterranean formation, based, at least in part, on an inversion and the velocities of the refracted seismic waves.

11. A system as defined in claim 10 further wherein the executable instructions, when executed, further cause the processor to:
a. generate a three-dimensional image using the three-dimensional velocity model of the subterranean formation.

12. A system as defined in claim 10 further wherein:
a. the surface above the subterranean formation is an ocean floor or a surface of dry land.

13. A system as defined in claim 10 further wherein:
a. the receiver nodes are geophones or hydrophones.

14. A system as defined in claim 10 further wherein:
a. the first zone contains a salt formation and the second zone contains a fluid reservoir comprising at least one of hydrocarbon fluids and nonhydrocarbon fluids.

15. A system as defined in claim 10 further wherein:
a. the geophones are spread over a geophone area with a longest dimension of at least 25 km; and
b. the transmitter travels over a transmitter area with an aperture length of at least 15 km.

16. A system as defined in claim 10 further wherein:
a. the first zone, the second zone, and the basement each has a characteristic depth;
b. wherein the receiver nodes are spread over a node area with a longest dimension that is determined as a function of the characteristic depths of the first zone, the second zone, and the basement; and c. wherein the transmitter travels over a transmitter area with an aperture length determined by a function of the longest dimension of the receiver node area.

17. A system as defined in claim 10 further wherein:
a. adjacent nodes are spaced from each other approximately 1 km to 2 km.

18. A method of creating a three-dimensional velocity model of a subterranean formation below an ocean floor comprising:
  a. controlling at least one seismic source to emit a plurality of seismic waves into the subterranean formation,
    i. wherein the subterranean formation comprises a salt formation above a sediment layer,
    ii. wherein the sediment layer is above a basement,
    iii. wherein the seismic waves are refracted by the subterranean formation to cause refracted seismic waves,
    iv. wherein refraction of the seismic waves by the basement causes at least one of the seismic waves to be conveyed through the subterranean formation such that it travels through the sediment layer and the salt formation;
  b. receiving signals from a seismic recording system that is disposed on a surface of the earth,
    i. wherein the seismic recording system comprises a plurality of nodes,
    ii. wherein the seismic recording system is configured to receive the refracted seismic waves and output a signal based on the received refracted seismic waves,
  c. recording data about the refracted seismic waves using, at least in part, the received signal from the seismic recording system;
  d. determining velocities of the refracted seismic waves based, at least in part, on the recorded data about the refracted seismic waves; and
  e. converting the determined velocities of the refracted seismic waves into a three-dimensional velocity model of the subterranean formation.

19. A method as defined in claim 18 further wherein the executable instructions, when executed, further cause the processor to:
a. generate a three-dimensional image using the three-dimensional velocity model of the subterranean formation.

20. A method as defined in claim 18 further wherein:
a. the sediment layer contains a fluid reservoir which contains at least one of hydrocarbon fluids and non-hydrocarbon fluids.

21. A method as defined in claim 18 further wherein:
a. the geophones are spread over a geophone area with a longest dimension of at least 25 km; and
b. the transmitter travels over a transmitter area with an aperture length of at least 15 km.

22. A method as defined in claim 18 further wherein:
a. the salt formation, the sediment layer, and the basement each has a characteristic depth;
b. wherein the geophones are spread over a geophone area with a longest dimension that is determined as a function of the characteristic depths of the salt formation, the sediment layer, and the basement; and
c. wherein the transmitter travels over a transmitter area with an aperture length determined by a function of the longest dimension of the geophone area.

23. A method as defined in claim 18 further wherein:
a. the transmitter is located on a boat.

24. A method as defined in claim 18 wherein:
a. adjacent geophones are spaced from each other approximately 1 km to 2 km.

* * * * *